J. P. MERN.
Stop-Cocks.

No. 137,144. Patented March 25, 1873.

Witnesses:
John Becker.

Inventor:
J. P. Mern
per
Attorneys.

UNITED STATES PATENT OFFICE.

JOHN P. MERN, OF NEW YORK, N. Y.

IMPROVEMENT IN STOP-COCKS.

Specification forming part of Letters Patent No. 137,144, dated March 25, 1873.

*To all whom it may concern:*

Figure 1:
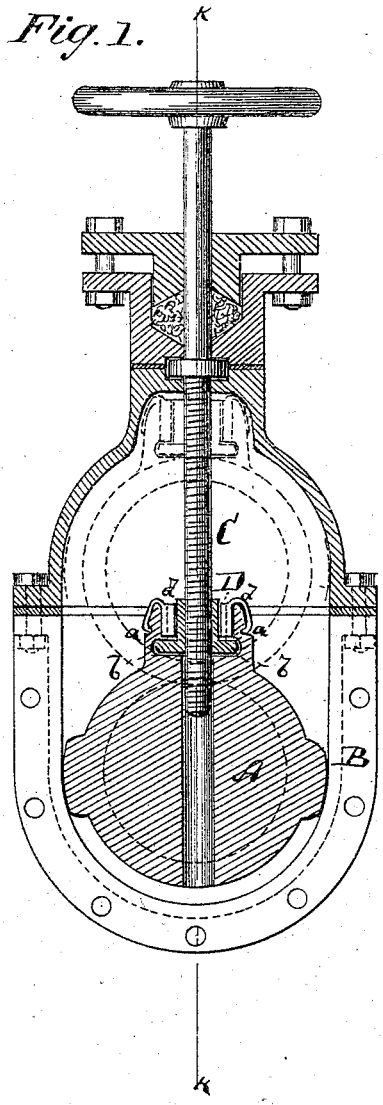
Figure 2:
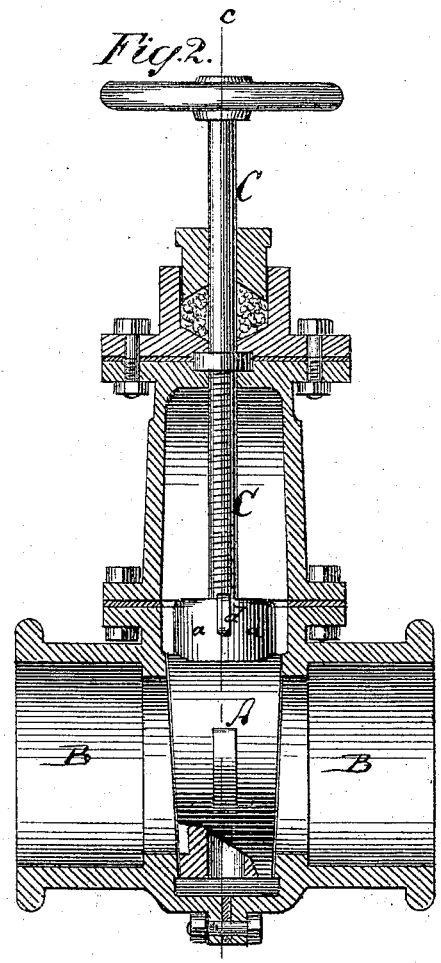
Figure 3:
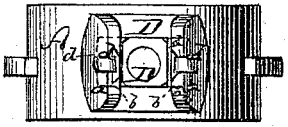

Be it known that I, JOHN P. MERN, of the city, county, and State of New York, have invented an Improved Stop-Cock, of which the following is a specification:

Figure 1 is a vertical transverse section of a stop-cock provided with my improvement, the line C C, Fig. 2, indicating the plane of section. Fig. 2 is a vertical longitudinal section of the same taken on the plane of the line K K, Fig. 1; and Fig. 3 is a top view of the same.

Similar letters of reference indicate corresponding parts.

The object of this invention is to permit the repair of the stop-cock spindle or stem, or its replacement when broken, without requiring the removal or elevation of the cock from or beyond the pipe. As at present connected the cock or valve must be removed from the pipe whenever the stem is broken for the purpose of allowing the detachment of the remaining lower nut of the stem from the cock or valve, and consequently the pipe to which such valve is fitted must be left open during repair. Considerable loss of substances, otherwise arrested by the valve, ensues while awaiting the repair of the valve and the replacement of its stem. My invention consists in fitting into the upper part of the valve or cock a nut, into which the stem or spindle is screwed, and which nut is confined between two outwardly-projecting lips of the valve in such manner that when the stem is broken or requires to be repaired the nut may be turned one-quarter of a revolution, and thereby brought with its narrow side between the said lips, so that it can be lifted clear out of the same, thus permitting the bodily withdrawal from the valve of the remaining portion of the broken stem and its detachment from the nut and the subsequent replacement of the nut, and replacement of a new or repaired stem, all without disturbing the valve in the pipe or without opening the pipe.

In the drawing, the letter A represents the valve arranged in the pipe B for closing the same. C is the stem, by means of which the valve can be raised or lowered to open or close the pipe B. D is a nut fitted into the upper part of the valve, and made of such size that it will fit in any position between the two projecting lips *a a* of the valve. At the lower part the nut is provided with projecting flanges *b b*, which are preferably of segmental form, and which, when the nut is in position for operating the valve, enter grooves or recesses that are cut into the insides of lips *a*, in manner clearly indicated in Fig. 1. When the nut is thus locked in the valve by its projecting flanges *b* it becomes vertically united to the valve—that is to say, it will, when the stem C that passes through it is turned to raise or lower it, also raise or lower the valve. Keys or wedges *d*, or equivalent fastening devices, are applied against the sides of the nut, between the same and the lips *a*, to prevent the nut from turning on or in the valve.

Whenever the stem C should break or want repairing, the keys *d* or their equivalents are withdrawn, and the nut is then turned one-fourth of a revolution, so that its flanges *b* will come out of the recesses in the lips *a*, and will therefore no longer lock the nut in said lips. Thereupon the nut can be vertically raised from out of the valve, and with it, also, that portion of the stem C that may have remained in it, the valve itself remaining in the pipe B to close the same.

Having thus described my invention, I claim as new and desire to secure by Letters Patent—

The keys *d*, in combination with the valve A and nut D, substantially as and for the purpose described.

JOHN P. MERN.

Witnesses:
 A. V. BRIESEN,
 T. B. MOSHER.